US005691707A

United States Patent [19]
Smith et al.

[11] Patent Number: 5,691,707
[45] Date of Patent: Nov. 25, 1997

[54] SENSORY FITTING FOR MONITORING BEARING PERFORMANCE

[75] Inventors: Charles C. Smith; Thomas R. Bernard, both of Baton Rouge, La.

[73] Assignee: Security Operating Systems, Inc., Baton Rouge, La.

[21] Appl. No.: 573,428

[22] Filed: Dec. 15, 1995

[51] Int. Cl.⁶ .................................................. G08B 21/00
[52] U.S. Cl. ........................... 340/682; 184/108; 340/683
[58] Field of Search .................................. 340/682, 683; 73/593, 658, 660; 184/108, 105.2, 105.3, 6.4; 364/551.01, 508, 557; 116/101, 216; 246/169 A; 374/208

[56] References Cited

U.S. PATENT DOCUMENTS

| | | | |
|---|---|---|---|
| 3,548,396 | 12/1970 | Roberts | 340/682 X |
| 3,603,280 | 9/1971 | Zahuranec | 116/218 |
| 4,340,886 | 7/1982 | Boldt et al. | 340/682 |
| 4,812,826 | 3/1989 | Kaufman et al. | 340/682 |
| 5,350,040 | 9/1994 | Gribble | 340/682 X |
| 5,381,692 | 1/1995 | Winslow et al. | 340/682 X |
| 5,544,073 | 8/1996 | Piety et al. | 364/508 |

OTHER PUBLICATIONS

Specifications Brochure for "Monolithic Accelerometer with Signal Conditioning", Model No. ADXL50, from Analog Devices—16 pgs.—undated.

*Primary Examiner*—Thomas Mullen
*Attorney, Agent, or Firm*—John F. Sieberth; R. Andrew Patty, II

[57] ABSTRACT

Described is a device for monitoring bearing performance in apparatus having an aperture sized and configured to receive a grease fitting. The device includes a temperature sensing component or a vibration sensing components, or both, to enable detection of impending bearing failure, and is adapted to either replace or supplement conventional grease fittings.

59 Claims, 4 Drawing Sheets

SENSORY FITTING FOR MONITORING BEARING PERFORMANCE

TECHNICAL FIELD

This invention relates a device for the monitoring of bearing performance in apparatus having one or more apertures sized and configured for grease fittings. As used herein, the term bearings includes, but is not limited to, ball bearings, rotary bearings, and bushings.

BACKGROUND

Conventional bearing housings well known in the mechanical arts have grease ports through which grease or other lubricant may be injected into the housing for reducing friction between the bearing and the shaft rotating within the housing. Typically, these grease ports are threaded apertures designed to receive a threaded grease fitting. The grease fitting is removably insertable into the grease port, and includes an axial bore specially configured to permit grease or other lubricant to be injected through the fitting and into the bearing housing without leakage. Notwithstanding this feature, bearings within such housings are prone to fail over time from excessive wear and heat generated by friction between the bearing and the rotary shaft or other objects in contact with the bearing.

U.S. Pat. No. 3,603,280 to Zahuranec discloses a fitting which works in conjunction with a static pressure line, a temperature sensitive fusible plug, and a pressure sensitive alarm to warn of a component's increased temperature, increased temperature in the bearing housing signifying impending bearing failure. Bearing failure can cause equipment to become inoperable and may be hazardous, depending upon the particular function of the apparatus which includes the bearing. Because of the importance of maintaining functional equipment where ever bearings are employed, the ability to reliably and continuously monitor bearing performance during equipment operation and to forecast bearing failure would constitute a significant contribution to equipment maintenance and safety, especially if such a contribution could be made without otherwise affecting the functionality or design of the apparatus or housing containing the monitored bearing.

SUMMARY OF THE INVENTION

The invention described herein is deemed to constitute such a contribution by providing a device for monitoring bearing performance in apparatus having at least one aperture sized and disposed to connectably receive a grease fitting for providing lubricant to the bearing. The device comprises a sensing fitting sized and configured to be connectably received in the aperture. In one embodiment of the invention, the sensing fitting includes both temperature sensing means and vibration sensing means to enable detection of impending bearing failure. Thus, in this embodiment impending bearing failure can be sensed by either or both of two indicators of impending bearing failure—an increase in temperature and an increase in vibration. In another embodiment, the sensing fitting includes temperature sensing means alone, while in yet another embodiment, the sensing fitting includes vibration sensing means alone. All such systems are effective for early detection of the inception of bearing failure.

In preferred embodiments having a sensing fitting with temperature sensing means, the temperature sensing means further comprises either (i) a thermistor temperature detector, which undergoes a change in resistance in response to a change in temperature within the apparatus, or (ii) a thermocouple sensing element, which undergoes a change in current in response to a change in temperature within the apparatus. Where a thermistor temperature detector is used, it is particularly preferred that the detector be adapted to send a signal to a receiver capable of converting the signal into an audible or visual record of the temperature within the apparatus and/or producing an audible or visual alarm if the temperature reaches a preselected level. When a thermocouple sensing element is used, it is particularly preferred that the element be adapted to send a signal to a receiver capable of converting the signal into an audible or visual record of the temperature within the apparatus and/or producing an audible or visual alarm if the temperature reaches a preselected level. It is also particularly preferred that the temperature sensing means be adapted to constantly send the aforesaid signal, and that the receiver be capable of trending the data produced by conversion of the aforesaid signal to provide trended data regarding temperature levels and impending bearing failure.

In preferred embodiments having a sensing fitting with vibration sensing means, the vibration sensing means further comprises a vibration sensor capable of detecting vibration within an x, y and/or z plane. It is particularly preferred that the sensor be adapted, upon detection of vibration within an x, y and/or z plane, to send a signal to a receiver capable of converting the signal into an audible or visual record of the vibration within the apparatus and/or producing an audible or visual alarm if the vibration reaches a preselected level. It is also particularly preferred that the vibration sensing means be adapted to constantly send the aforesaid signal, and that the receiver be capable of trending the data produced by conversion of the aforesaid signal to provide trended data regarding vibration levels and impending bearing failure.

Preferred embodiments also comprise a sensing fitting which is in addition a grease fitting for providing lubricant to said bearing. Here, the sensing fitting has an axial bore throughout and is configured on one end to be detachably yet fixedly inserted into an aperture which is sized and configured to receive a grease fitting. As used herein, "axial" is deemed to mean parallel to the axis of the device, but not necessarily coaxial therewith. The other end of the sensing fitting is configured to function as a grease fitting through which lubricant may be injected into the apparatus via the axial bore. Thus, in this embodiment, the grease fitting is integral to the sensing fitting, and the device may be substituted for a conventional grease fitting to permit monitoring of bearing performance and to enable detection of impending bearing failure, without sacrificing the utility of a conventional grease fitting.

In a particularly preferred embodiment, the sensing fitting is separate from, but employed in conjunction with, a grease fitting. There, the sensing fitting is configured on one end to be detachably yet fixedly inserted into an aperture of the apparatus containing the bearing which is sized and configured to receive a grease fitting. The sensing fitting has an axial bore throughout which is stepped so that the portion of the bore proximate to the other end of the fitting is sized and configured to provide an aperture for the detachable yet fixed attachment of a grease fitting. In this particularly preferred embodiment, the sensing fitting provides an intermediate connection between the grease fitting and the apparatus containing the bearing. The fitting thereby acts as a supplement to a grease fitting to permit monitoring of bearing performance and to enable detection of impending bearing failure, without sacrificing the utility of a grease fitting.

This invention also provides for an improvement in apparatus which comprises a housing having a rotary shaft, at least one bearing in which the shaft is rotated, and at least one aperture sized and disposed to connectably receive a grease fitting for providing lubricant to said housing, the improvement being a sensing fitting as described herein for monitoring bearing performance and to enable detection of impending bearing failure.

In addition, this invention provides for a method of monitoring bearing performance in apparatus having at least one aperture sized and disposed to connectably receive a grease fitting for providing lubricant to said bearing, such method comprising placing in the aperture a sensing fitting as described herein to enable detection of impending bearing failure.

These and other embodiments and features of the invention will become still further apparent from the ensuing description, appended claims and accompanying drawings.

BRIEF DESCRIPTION OF THE DRAWINGS

In each of the above figures, like numerals are used to refer to like parts among the several views.

DETAILED DESCRIPTION OF THE INVENTION

Figure 1:
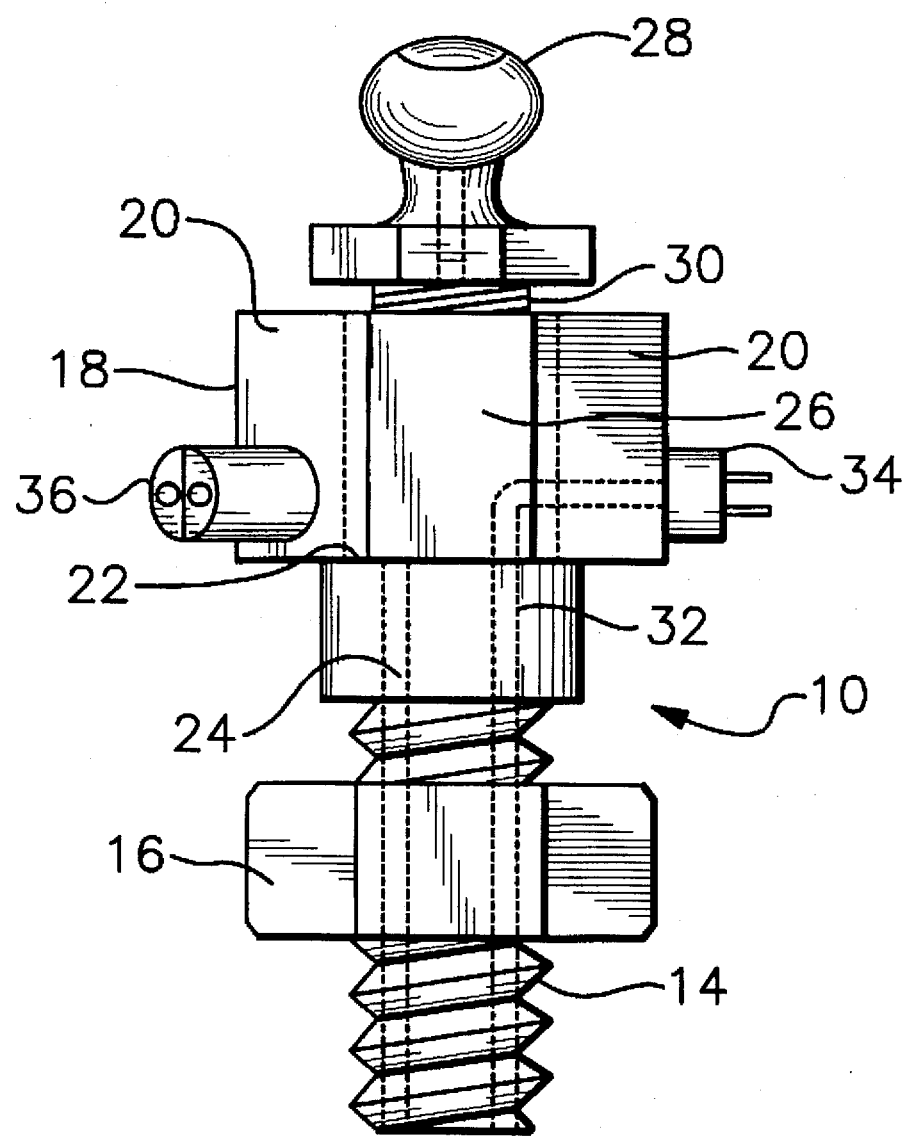
FIG. 1 is a side view of a preferred embodiment of this invention.
Figure 2:
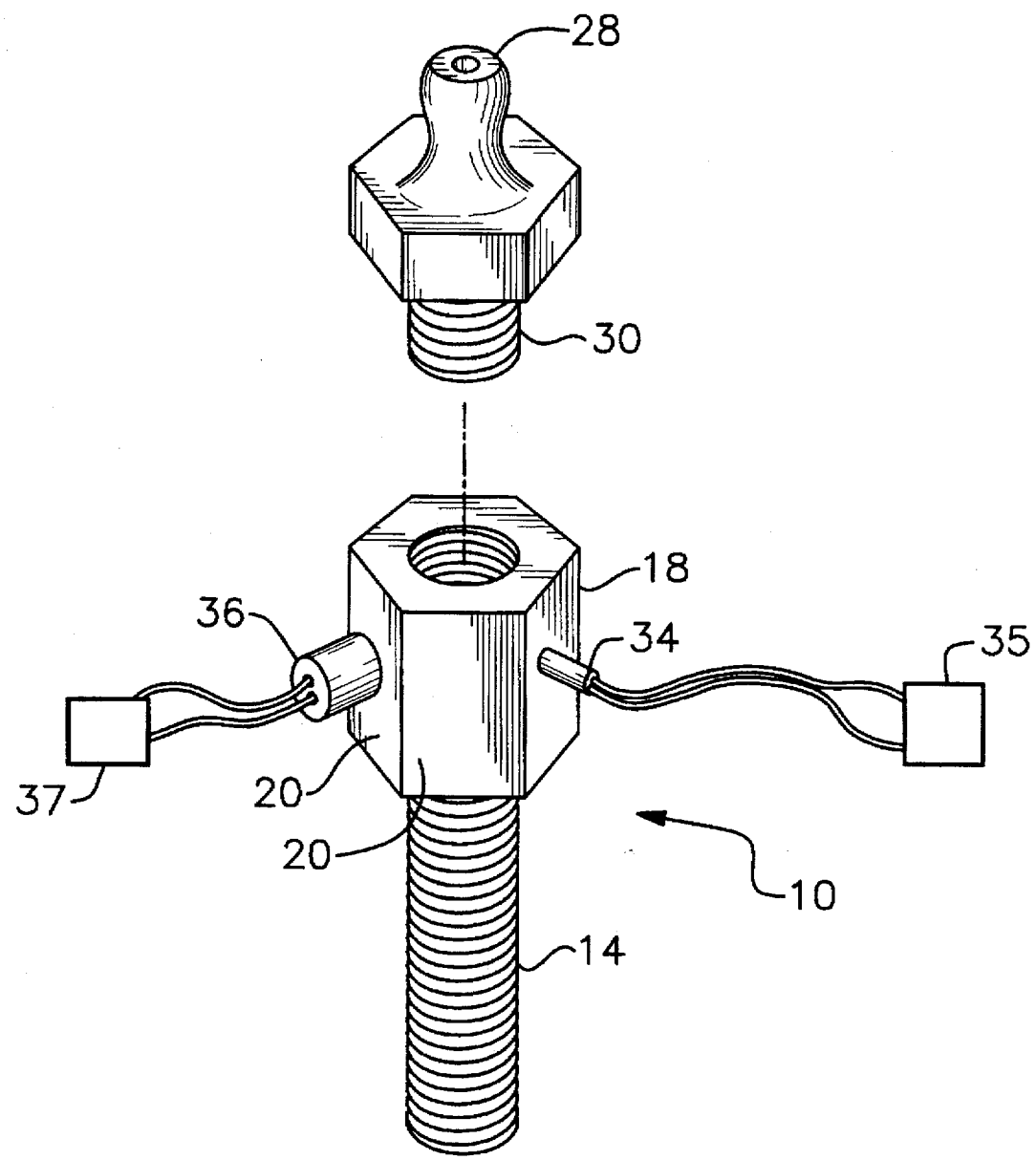
FIG. 2 is a view in perspective of a preferred embodiment of this invention.

As previously noted, this invention provides, among other things, a device for monitoring bearing performance in apparatus having at least one aperture sized and disposed to connectably receive a grease fitting for providing lubricant to the bearing. Referring now to the drawings, FIGS. 1 and 2 depict a preferred embodiment of the invention. Sensing fitting 10 has a connecting end portion 14 with threads configured to meet and cooperate with a threaded aperture for receiving a grease fitting in apparatus containing one or more bearings. The threads of connecting end portion 14 also meet and cooperate with the threads of a lock nut 16, which may be employed to control the depth to which sensing fitting 10 is inserted into the apparatus housing the subject bearing or bearings. Receiving end portion 18 of sensing fitting 10 has a larger diameter than end portion 14, and has an outer surface which includes a plurality of faces 20 to facilitate tightening and loosening of connecting end portion 14 when placed in a threaded aperture.

Sensing fitting 10 has an axial bore along its longitudinal axis which acts as a grease path. The grease path includes a step 22, which divides the path into two segments, the first path segment 24 running the length of connecting end portion 14, and the second path segment 26 running the length of receiving end portion 18 and having a larger diameter than first path segment 24 for receiving grease fitting 28. Second segment 26 is threaded to fixably yet detachably receive threaded portion 30 of grease fitting 28.

Sensing fitting 10 also has a second bore, wire path 32, which is offset from the grease path. Wire path 32 runs parallel to the longitudinal axis of sensing fitting 10 for the entire length of connecting end portion 14. Thereafter, wire path 32 turns substantially perpendicular to and away from the grease path at a selected point along receiving end portion 18, ending at an aperture in the wall of receiving end portion 18. Temperature sensing means in the form of either a thermistor or a thermocouple element 34 is attached to the outer wall of receiving end portion 18 at the aperture formed by wire path 32. Element 34 includes wires which extend from the element through the entire length of wire path 32. Preferably, wire path 32 containing the wires of element 34 is sealed with a suitable heat-resistant sealant to prevent grease or other lubricants from traveling through wire path 32 when sensing fitting 10 is installed and the apparatus is operative.

Alternatively, wire path 32 may run parallel to the longitudinal axis of sensing fitting 10 for the entire length of connecting end portion 14, and thereafter intersect with the grease path at step 22 before turning perpendicular to and away from the grease path and ending at an aperture in the wall of receiving end portion 18. In such case, wire path 32 is preferably insulated with a suitable heat-resistant sealant where the wires contained therein may be exposed to lubricant within the grease path.

Finally, vibration sensor 36 is attached to the outer wall of receiving end portion 18, thereby enabling detection of vibration associated with apparatus when sensing fitting 10 is installed in said aperture. Vibration sensor 36 may be constructed to sense vibration in a number of ways. In a preferred embodiment, vibration sensor 36 is a monolithic accelerometer with signal conditioning. Such an accelerometer is commercially available from Analog Devices at One Technology Way, P.O. Box 9106, Norwood Mass. 02062-9106, U.S.A., Model No. ADXL50.

Figure 3:
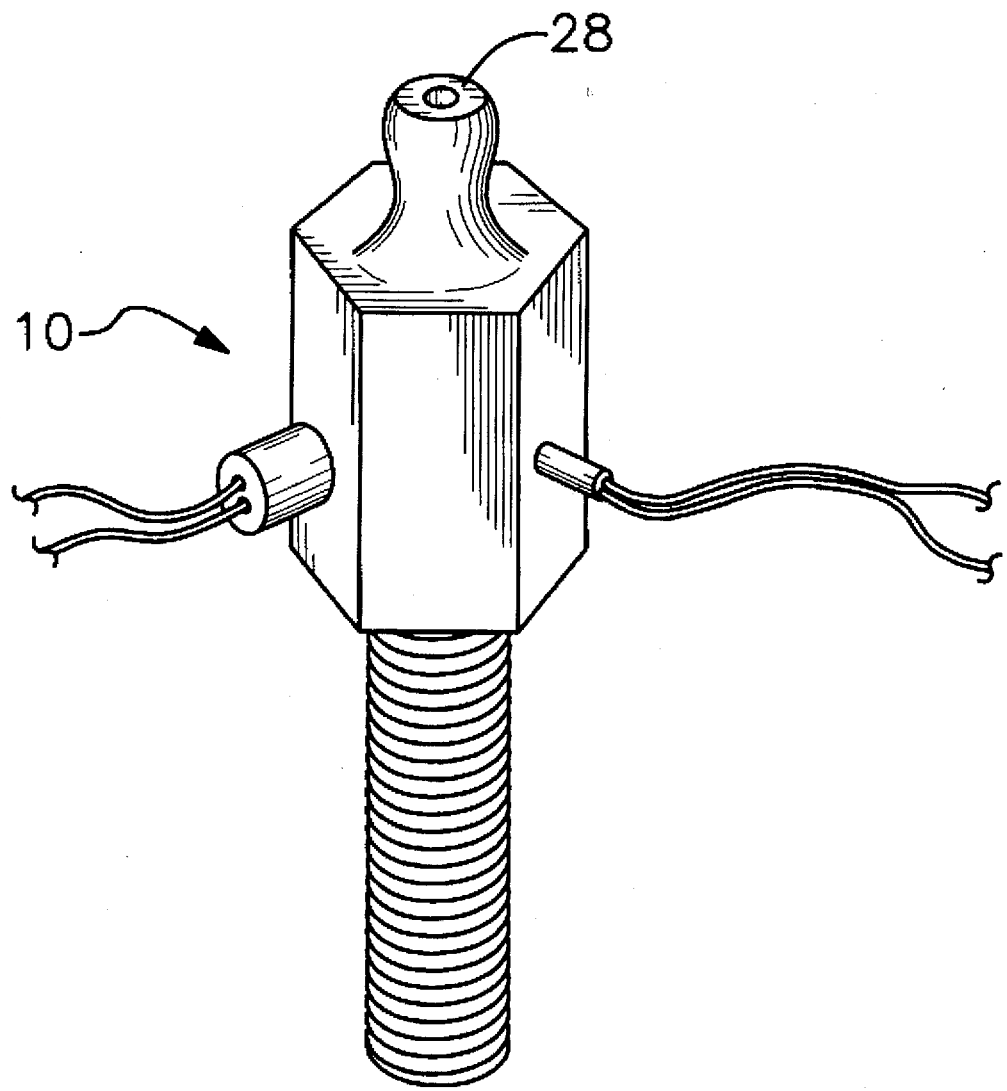
FIG. 3 is a view in perspective of another preferred embodiment of this invention.

It should be understood and appreciated, therefore, that once grease fitting 28 is fixedly yet detachably attached to sensing fitting 10, and sensing fitting 10 is installed in an aperture in the subject apparatus, a grease path is created which extends through both fittings and into the apparatus housing one or more bearings. In another embodiment, sensing fitting 10 may be integral with grease fitting 28 so that the two fittings become one. This embodiment is illustrated in FIG. 3. It also should be noted that it is not required that connecting end portion 14 be threaded, as long as it is configured to permit fitting 10 to be fixedly yet detachably attached to the relevant apparatus. Likewise, where the two fittings are detachable (i.e., not integral to one another), it is not required that second path segment 26 be threaded, as long as it is configured to permit grease fitting 28 to be fixedly yet detachably attached to fitting 10. In both cases, various other means, including snap-on and clamp mechanisms, may be equally effective. Locking nut 16 is also optional, but is preferred where the sensing fitting's proximity to the monitored bearing is important for increased levels of sensitivity to temperature change. Both lock nut 16 and sensing fitting 10 may be fabricated from any number of heat absorbing, resilient compounds, metals or alloys. Examples include but are not limited to stainless steel, aluminum, cast iron, and brass.

The diameters for the first path segment 24 and wire path 32 will vary depending upon the particular application, but the sum of their diameters at connecting end portion 14 will always be less than the smallest diameter of the sensing fitting itself. Second path segment 26 will have a diameter which is dependent upon the particular grease fitting employed. More viscous lubricants may require that grease path have a larger diameter than diameter requirements of less viscous lubricants. In any event, the diameters of the grease path must enable, at a minimum, conventional injection of a sufficient volume of lubricant to maintain the required level of lubricant to the bearing. The diameter of wire path 32 in a given application of the fitting should permit insertion of the wires extending from the particular temperature sensing means employed.

It should be further understood that FIGS. 1, 2 and 3 illustrate an embodiment utilizing both a temperature sensor and a vibration detector. Other embodiments of this invention may include either a temperature sensor or a vibration detector without the presence of the other.

As previously stated, it is also particularly preferred that the particular temperature sensing means, vibration sensing means, or both, be adapted to constantly send their respective signal, and that their associated receivers 35 and 37, respectively, (illustrated on FIG. 2 only) be capable of trending the data produced by conversion of the respective signal to provide trended data regarding temperature and/or vibration levels, as the case may be, as well as impending bearing failure. Such receivers may be adapted to have this trending capability through connection to or integration with a computer, plotter, or other device capable of compiling, and visually displaying data produced over time from conversion of the particular signal involved.

Figure 4:
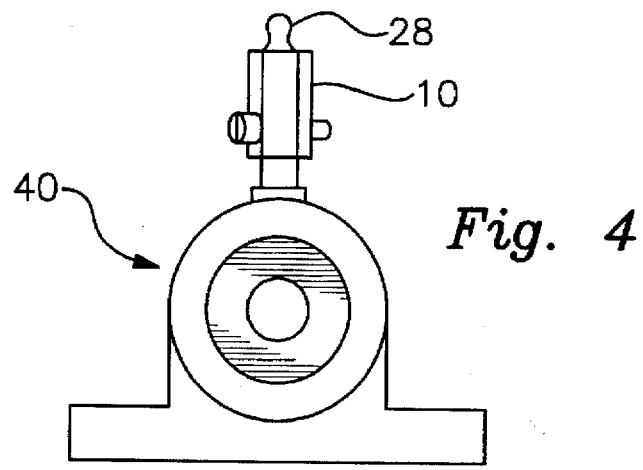
FIG. 4 is a cross section view of a bearing block which includes the device of this invention.
Figure 5:
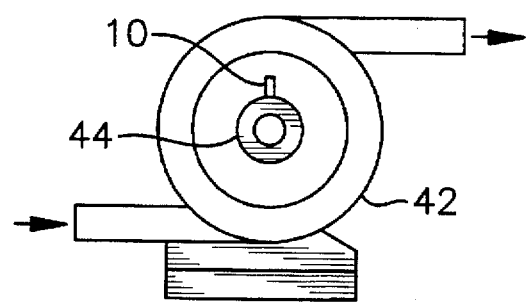
FIG. 5 is a side view of a pump including the device of this invention.
Figure 6:
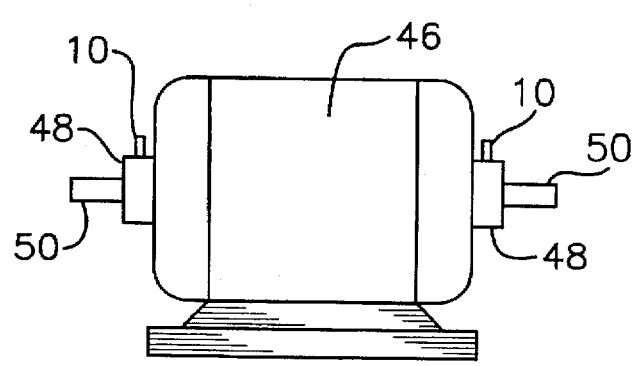
FIG. 6 is a side view of an electric motor including the device of this invention.

FIGS. 4, 5 and 6 illustrate examples of apparatus which may employ the device of this invention. FIG. 4 illustrates a bearing block 40 in cross-section on which fitting 10 is installed and has attached thereto grease fitting 28. FIG. 5 shows a cross-sectional view of pump 42, wherein fitting 10 is installed on bearing housing 44. FIG. 6 shows a side view of an electric motor 46 in which fitting 10 has been installed on two bearing housings 48 for shaft 50.

This invention is susceptible to considerable variation in its practice. Therefore, the foregoing description is not intended to limit, and should not be construed as limiting, the invention to the particular exemplification presented hereinabove. Rather, what is intended to be covered is as set forth in the ensuing claims and the equivalents thereof permitted as a matter of law.

What is claimed is:

1. A device for monitoring bearing performance in apparatus having at least one aperture sized and disposed to connectably receive a grease fitting for providing lubricant to said bearing, which device comprises a sensing fitting sized and configured to be connectably received in said aperture, said sensing fitting including (a) temperature sensing means to enable detection of impending bearing failure, (b) a connecting end sized and configured to be fixedly yet detachably received by said aperture and when installed in said aperture said connecting end being proximate to said bearing, (c) an axial bore extending along the longitudinal axis of said sensing fitting for providing a grease path, and (d) a wire path extending through said connecting end and parallel with but offset from said axial bore of said sensing fitting, a portion of said temperature sensing means extending the length of said wire path.

2. A device according to claim 1 wherein said temperature sensing means comprises a thermistor temperature detector which undergoes a change in resistance in response to a change in temperature within said apparatus.

3. A device according to claim 2 wherein said detector is adapted to send a signal to a receiver capable of converting said signal into an audible or visual record of the temperature within said apparatus and/or producing an audible or visual alarm if the temperature reaches a preselected level.

4. A device according to claim 1 wherein said temperature sensing means comprises a thermocouple sensing element which undergoes a change in current in response to a change in temperature within said apparatus.

5. A device according to claim 4 wherein said element is adapted to send a signal to a receiver capable of converting said signal into an audible or visual record of the temperature within said apparatus and/or producing an audible or visual alarm if the temperature reaches a preselected level.

6. A device according to claim 1 wherein said sensing fitting is in addition a grease fitting for providing lubricant to said bearing.

7. A device according to claim 1 wherein said sensing fitting also includes a receiving end, and wherein the portion of said bore proximate to said receiving end being sized and configured to fixedly yet detachably receive a grease fitting.

8. A device for monitoring bearing performance in apparatus having at least one aperture sized and disposed to connectably receive a grease fitting for providing lubricant to said bearing, which device comprises a sensing fitting sized and configured to be connectably received in said aperture, said sensing fitting including (a) vibration sensing means to enable detection of impending bearing failure, (b) temperature sensing means to enable detection of impending bearing failure, (c) a connecting end sized and configured to be fixedly yet detachably received by said aperture and when installed in said aperture said connecting end being proximate to said bearing, (d) an axial bore extending along the longitudinal axis of said sensing fitting for providing a grease path, and (e) a wire path extending through said connecting end and parallel with but offset from said axial bore of said sensing fitting, a portion of said temperature sensing means extending the length of said wire path.

9. A device according to claim 8 wherein said sensing fitting is in addition a grease fitting for providing lubricant to said bearing.

10. A device according to claim 8 wherein said sensing fitting also includes a receiving end, and wherein the portion of said bore proximate to said receiving end being sized and configured to fixedly yet detachably receive a grease fitting.

11. A device according to claim 8 wherein said temperature sensing means comprises a thermistor temperature detector which undergoes a change in resistance in response to a change in temperature within said apparatus.

12. A device according to claim 11 wherein said sensing fitting is in addition a grease fittng for providing lubricant to said bearing.

13. A device according to claim 11 wherein said sensing fitting also includes a receiving end, and wherein the portion of said bore proximate to said receiving end being sized and configured to fixedly yet detachably receive a grease fitting.

14. A device according to claim 11 wherein said detector is adapted to send a signal to a receiver capable of converting said signal into an audible or visual record of the temperature within said apparatus and/or producing an audible or visual alarm if the temperature reaches a preselected level.

15. A device according to claim 11 wherein said vibration sensing means comprises a vibration sensor capable of detecting vibration within an x, y and/or z plane.

16. A device according to claim 15, wherein said sensor is adapted, upon detecting vibration within an x, y and/or z plane, to send a signal to a receiver capable of converting said signal into an audible or visual record of the vibration within said apparatus and/or producing an audible or visual alarm if the vibration reaches a preselected level.

17. A device according to claim 16, wherein said detector is adapted to send a signal to a receiver capable of convening said signal into an audible or visual record of the temperature within said apparatus and/or producing an audible or visual alarm if the temperature reaches a preselected level.

18. A device according to claim 17 wherein said detector and said sensor are adapted to constantly send their respective signal, and said receivers respectively are adapted to also trend data produced from conversion of the respective signals.

19. A device according to claim 17 wherein said sensing fitting is in addition a grease fitting for providing lubricant to said bearing.

20. A device according to claim 17 wherein said sensing fitting also includes a receiving end, and wherein the portion of said bore proximate to said receiving end being sized and configured to fixedly yet detachably receive a grease fitting.

21. A device according to claim 8 wherein said temperature sensing means comprises a thermocouple sensing element which undergoes a change in current in response to a change in temperature within said apparatus.

22. A device according to claim 21 wherein said element is adapted to send a signal to a receiver capable of convening said signal into an audible or visual record of the temperature within said apparatus and/or producing an audible or visual alarm if the temperature reaches a preselected level.

23. A device according to claim 22 wherein said vibration sensing means comprises a vibration sensor capable of detecting vibration within an x, y and/or z plane.

24. A device according to claim 23, wherein said sensor is adapted, upon detecting vibration within an x, y and/or z plane, to send a signal to a receiver capable of convening said signal into an audible or visual record of the vibration within said apparatus and/or producing an audible or visual alarm if the vibration reaches a preselected level.

25. A device according to claim 24 wherein said element and said sensor are adapted to constantly send their respective signals, and said receivers respectively are adapted to also trend data produced from conversion of the respective signals.

26. A device according to claim 24 wherein said sensing fitting is in addition a grease fitting for providing lubricant to said bearing.

27. A device according to claim 24 wherein said sensing fitting also includes a receiving end, and wherein the portion of said bore proximate to said receiving end being sized and configured to fixedly yet detachably receive a grease fitting.

28. A device according to claim 8 wherein said vibration sensing means comprises a vibration sensor capable of detecting vibration within an x, y and/or z plane.

29. A device according to claim 28, wherein said sensor is adapted, upon detecting vibration within an x, y and/or z plane, to send a signal to a receiver capable of convening said signal into an audible or visual record of the vibration within said apparatus and/or producing an audible or visual alarm if the vibration reaches a preselected level.

30. A device according to claim 29 wherein said sensing fitting is in addition a grease fitting for providing lubricant to said bearing.

31. A device according to claim 29 wherein said sensing fitting also includes a receiving end, and wherein the portion of said bore proximate to said receiving end being sized and configured to fixedly yet detachably receive a grease fitting.

32. In apparatus which comprises a housing having a rotary shaft, at least one bearing in which said shaft is rotated, and at least one aperture sized and disposed to connectably receive a grease fitting for providing lubricant to said housing, the improvement wherein a sensing fitting for monitoring bearing performance is connectably received in said aperture, said sensing fitting including (a) temperature sensing means to enable detection of impending bearing failure, (b) a connecting end sized and configured to be fixedly yet detachably received by said aperture and when installed in said aperture said connecting end being proximate to said bearing, (c) an axial bore extending along the longitudinal axis of said sensing fitting for providing a grease path, and (d) a wire path extending through said connecting end and parallel with but offset from said axial bore of said sensing fitting, a portion of said temperature sensing means extending the length of said wire path.

33. Apparatus according to claim 30 wherein said temperature sensing means comprises a thermistor temperature detector which undergoes a change in resistance in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting is in addition a grease fitting for providing lubricant to said bearing.

34. Apparatus according to claim 32 wherein said temperature sensing means comprises a thermistor temperature detector which undergoes a change in resistance in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting also includes a receiving end, and wherein the portion of said bore proximate to said receiving end being sized and configured to fixedly yet detachably receive a grease fitting.

35. Apparatus according to claim 32 wherein said temperature sensing means comprises a thermocouple sensing element which undergoes a change in current in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting is in addition a grease fitting for providing lubricant to said bearing.

36. Apparatus according to claim 32 wherein said temperature sensing means comprises a thermocouple sensing element which undergoes a change in current in response to a change in temperature within said housing and is adapted to send a signal to a receiver capable of converting said signal into an audible or visual record of the temperature within said housing and/or producing an audible or visual alarm if the temperature reaches a preselected level, and wherein said sensing fitting also includes a receiving end, and wherein the portion of said bore proximate to said receiving end being sized and configured to fixedly yet detachably receive a grease fitting.

37. In apparatus which comprises a housing having a rotary shaft, at least one bearing in which said shaft is rotated, and at least one aperture sized and disposed to connectably receive a grease fitting for providing lubricant to said housing, the improvement wherein a sensing fitting for monitoring bearing performance is connectably received in said aperture, said sensing fitting including (a) vibration sensing means to enable detection of impending bearing failure, (b) temperature sensing means to enable detection of impending bearing failure, (c) a connecting end sized and configured to be fixedly yet detachably received by said aperture and when installed in said aperture said connecting end being proximate to said bearing, (d) an axial bore extending along the longitudinal axis of said sensing fitting for providing a grease path, and (e) a wire path extending through said connecting end and parallel with but offset from said axial bore of said sensing fitting, a portion of said temperature sensing means extending the length of said wire path.

38. Apparatus according to claim 37 wherein said temperature sensing means comprises a thermistor temperature detector which undergoes a change in resistance in response to a change in temperature within said housing and is adapted to send a signal to a receiver capable of converting said signal into an audible or visual record of the temperature within said housing and/or producing an audible or visual alarm if the temperature reaches a preselected level.

39. Apparatus according to claim 38 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting is in addition a grease fitting for providing lubricant to said bearing.

40. Apparatus according to claim 38 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting also includes a receiving end, and wherein the portion of said bore proximate to said receiving end being sized and configured to fixedly yet detachably receive a grease fitting.

41. Apparatus according to claim 37 wherein said temperature sensing means comprises a thermocouple sensing element which undergoes a change in current in response to a change in temperature within said housing and is adapted to send a signal to a receiver capable of converting said signal into an audible or visual record of the temperature within said housing and/or producing an audible or visual alarm if the temperature reaches a preselected level.

42. Apparatus according to claim 41 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting is in addition a grease fitting for providing lubricant to said bearing.

43. Apparatus according to claim 41 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting also includes a receiving end, and wherein the portion of said bore proximate to said receiving end being sized and configured to fixedly yet detachably receive a grease fitting.

44. Apparatus according to claim 37 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting is in addition a grease fitting for providing lubricant to said bearing.

45. Apparatus according to claim 37 wherein said vibration sensing means comprises a vibration sensor capable of detecting vibration within an x, y and/or z plane and adapted, upon detecting such vibration, to send a signal to a receiver capable of converting said signal into an audible or visual record of the vibration within said housing and/or producing an audible or visual alarm if the vibration reaches a preselected level, and wherein said sensing fitting also includes a receiving end, and wherein the portion of said bore proximate to said receiving end being sized and configured to fixedly yet detachably receive a grease fitting.

46. A method of monitoring bearing performance in apparatus having at least one aperture sized and disposed to connectably receive a grease fitting for providing lubricant to said bearing, said method comprising placing in said aperture a sensing fitting sized and configured to be connectably received in said aperture, said sensing fitting including (a) temperature sensing means to enable detection of impending bearing failure, (b) a connecting end sized and configured to be fixedly yet detachably received by said aperture and when installed in said aperture said connecting end being proximate to said bearing, (c) an axial bore extending along the longitudinal axis of said sensing fitting for providing a grease path, and (d) a wire path extending through said connecting end and parallel with but offset from said axial bore of said sensing fitting, a portion of said temperature sensing means extending the length of said wire path.

47. A method according to claim 46 wherein said temperature sensing means comprises a thermistor temperature detector which undergoes a change in resistance in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting is in addition a grease fitting for providing lubricant to said bearing.

48. A method according to claim 46 wherein said temperature sensing means comprises a thermistor temperature detector which undergoes a change in resistance in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting also includes a receiving end, and wherein the portion of said bore proximate to said receiving end being sized and configured to fixedly yet detachably receive a grease fitting.

49. A method according to claim 46 wherein said temperature sensing means comprises a thermocouple sensing element which undergoes a change in current in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting is in addition a grease fitting for providing lubricant to said bearing.

50. A method according to claim 46 wherein said temperature sensing means comprises a thermocouple sensing element which undergoes a change in current in response to a change in temperature within said apparatus and is adapted to send a signal to a receiver capable of converting said signal into an audible or visual record of the temperature within said apparatus and/or producing an audible or visual alarm if the temperature reaches a preselected level, and wherein said sensing fitting also includes a receiving end, and wherein the portion of said bore proximate to said receiving end being sized and configured to fixedly yet detachably receive a grease fitting.

51. A method of monitoring bearing performance in apparatus having at least one aperture sized and disposed to connectably receive a grease fitting for providing lubricant to said bearing, said method comprising placing in said aperture a sensing fitting sized and configured to be connectably received in said aperture, said sensing fitting including (a) vibration sensing means to enable detection of impending bearing failure, (b) temperature sensing means to enable detection of impending bearing failure, (c) a connecting end sized and configured to be fixedly yet detachably received by said aperture and when installed in said aperture said connecting end being proximate to said bearing, (d) an axial bore extending along the longitudinal axis of said sensing fitting for providing a grease path, and (e) a wire path extending through said connecting end and parallel with but offset from said axial bore of said sensing fitting, a portion of said temperature sensing means extending the length of said wire path.

52. A method according to claim 51 wherein said temperature sensing means comprises a thermistor temperature detector which undergoes a change in resistance in response to a change in temperature within said apparatus and is adapted to send a signal to a receiver capable of converting said signal into an audible or visual record of the temperature within said apparatus and/or producing an audible or visual alarm if the temperature reaches a preselected level.

53. A method according to claim 52, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level, and wherein said sensing fitting is in addition a grease fitting for providing lubricant to said bearing.

54. A method according to claim 52, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level, and wherein said sensing fitting also includes a receiving end, and wherein the portion of said bore proximate to said receiving end being sized and configured to fixedly yet detachably receive a grease fitting.

55. A method according to claim 51 wherein said temperature sensing means comprises a thermocouple sensing element which undergoes a change in current in response to a change in temperature within said apparatus and is adapted to send a signal to a receiver capable of converting said signal into an audible or visual record of the temperature within said apparatus and/or producing an audible or visual alarm if the temperature reaches a preselected level.

56. A method according to claim 55, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level, and wherein said sensing fitting is in addition a grease fitting for providing lubricant to said bearing.

57. A method according to claim 55, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level, and wherein said sensing fitting also includes a receiving end, and wherein said sensing fitting has an axial bore along its longitudinal axis for providing a grease path, the portion of said bore proximate to said receiving end being sized and configured to fixedly yet detachably receive a grease fitting.

58. A method according to claim 51, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level, and wherein said sensing fitting is in addition a grease fitting for providing lubricant to said bearing.

59. A method according to claim 51, wherein said vibration sensing means comprises a vibration sensor capable of detecting vibration within an x, y and/or z plane and adapted, upon detecting such vibration, to send a signal to a receiver capable of converting said signal into an audible or visual record of the vibration within said apparatus and/or producing an audible or visual alarm if the vibration reaches a preselected level, and wherein said sensing fitting also includes a receiving end, and wherein the portion of said bore proximate to said receiving end being sized and configured to fixedly yet detachably receive a grease fitting.

* * * * *

UNITED STATES PATENT AND TRADEMARK OFFICE
CERTIFICATE OF CORRECTION

PATENT NO. : 5,691,707
DATED : November 25, 1997
INVENTOR(S) : Charles C. Smith, et. al.

It is certified that error appears in the above-identified patent and that said Letters Patent is hereby corrected as shown below:

On the title page, under the Heading [57] Abstract, line 4 reads "vibration sensing components" and should read --vibration sensing component--.

Claim 1, Column 5, line 51, reads "beating" and should read --bearing--.

Claim 17, Column 6, line 66, reads "convening" and should read --converting--.

Claim 22, Column 7, line 20, reads "convening" and should read --converting--.

Claim 24, Column 7, line 29, reads "convening" and should read --converting--.

Claim 29, Column 7, line 50, reads "convening" and should read --converting--.

Claim 33, Column 8, line 11, reads "30" and should read --32--.

Signed and Sealed this

Seventh Day of April, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,691,707

DATED : November 25, 1997

INVENTOR(S) : Charles C. Smith et al.

It is certified that error appears in the above-indentified patent and that said Letters Patent is hereby corrected as shown below:

Claim 57, Column 12, lines 28-30 delete "said sensing fitting has an axial bore along its longitudinal axis for providing a grease path,".

Signed and Sealed this

Twenty-first Day of July, 1998

Attest:

BRUCE LEHMAN

Attesting Officer

Commissioner of Patents and Trademarks